(12) United States Patent
Hinderliter

(10) Patent No.: US 12,735,968 B2
(45) Date of Patent: Sep. 15, 2026

(54) HYDRAULIC FRACTURING EQUIPMENT WITH NON-HYDRAULIC POWER

(71) Applicant: U.S. Well Services, LLC, Willow Park, TX (US)

(72) Inventor: Brandon N. Hinderliter, Willow Park, TX (US)

(73) Assignee: U.S. Well Services, LLC, Willow Park, TX (US)

( * ) Notice: Subject to any disclaimer, the term of this patent is extended or adjusted under 35 U.S.C. 154(b) by 0 days.

(21) Appl. No.: 18/653,381

(22) Filed: May 2, 2024

(65) Prior Publication Data

US 2024/0280009 A1 Aug. 22, 2024

Related U.S. Application Data

(63) Continuation of application No. 16/404,283, filed on May 6, 2019, now abandoned, which is a continuation
(Continued)

(51) Int. Cl.
*E21B 43/26* (2006.01)
*F04B 17/03* (2006.01)
(Continued)

(52) U.S. Cl.
CPC .......... *E21B 43/2607* (2020.05); *F04B 17/03* (2013.01); *F04B 49/06* (2013.01);
(Continued)

(58) Field of Classification Search
CPC .................................................... E21B 43/2607
See application file for complete search history.

(56) References Cited

U.S. PATENT DOCUMENTS 1,656,861 A 1/1928 Leonard
1,671,436 A 5/1928 Melott
(Continued)

FOREIGN PATENT DOCUMENTS

CA 2406801 11/2001
CA 2707269 12/2010
(Continued)

OTHER PUBLICATIONS

"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
(Continued)

*Primary Examiner* — Kenneth L Thompson
(74) *Attorney, Agent, or Firm* — Henry Patent Law Firm PLLC

(57) ABSTRACT

The present disclosure is directed to a hydraulic fracturing system for fracturing a subterranean formation. In an embodiment, the system can include an electric pump fluidly connected to a well associated with the formation, and configured to pump fluid into a wellbore associated with the well at a high pressure so that the fluid passes from the wellbore into the formation and fractures the formation. The system can further include one or more ancillary units associated with the fluid pumped into the wellbore. The system can further include a first motor electrically coupled to the electric pump to operate the electric pump, and one or more second motors, each of the second motors electrically coupled to each of the ancillary units to operate the one or more ancillary units.

18 Claims, 4 Drawing Sheets

Related U.S. Application Data of application No. 15/644,487, filed on Jul. 7, 2017, now Pat. No. 10,280,724.

(51) Int. Cl.
*F04B 49/06* (2006.01)
*F04B 49/20* (2006.01)
*F04B 51/00* (2006.01)
*H02P 5/74* (2006.01)
*H02P 27/04* (2016.01)
*H02P 27/06* (2006.01)

(52) U.S. Cl.
CPC .............. *F04B 49/20* (2013.01); *F04B 51/00* (2013.01); *H02P 5/74* (2013.01); *H02P 27/047* (2013.01); *H02P 27/06* (2013.01)

(56) References Cited

U.S. PATENT DOCUMENTS 2,004,077 A 6/1935 Mccartney et al.
2,183,364 A 12/1939 Bailey
2,220,622 A 11/1940 Homer
2,248,051 A 7/1941 Armstrong et al.
2,407,796 A 9/1946 Page
2,416,848 A 3/1947 Stewart
2,610,741 A 9/1952 Schmid
2,753,940 A 7/1956 Bonner
2,976,025 A 3/1961 Pro
3,055,682 A 9/1962 Bacher et al.
3,061,039 A 10/1962 Peters
3,066,503 A 12/1962 Fleming et al.
3,302,069 A 1/1967 Wilcox
3,334,495 A 8/1967 Jensen et al.
3,722,595 A 3/1973 Kiel
3,764,233 A 10/1973 Strickland
3,773,140 A 11/1973 Mahajan et al.
3,837,179 A 9/1974 Barth
3,849,662 A 11/1974 Blaskowski et al.
3,878,884 A 4/1975 Raleigh
3,881,551 A 5/1975 Terry et al.
4,037,431 A 7/1977 Sugimoto
4,100,822 A 7/1978 Rosman
4,151,575 A 4/1979 Hogue
4,226,299 A 10/1980 Hansen
4,265,266 A 5/1981 Kierbow et al.
4,411,313 A 10/1983 Johnson et al.
4,432,064 A 2/1984 Barker et al.
4,442,665 A 4/1984 Fick et al.
4,456,092 A 6/1984 Kubozuka et al.
4,506,982 A 3/1985 Smithers et al.
4,512,387 A 4/1985 Rodriguez et al.
4,529,887 A 7/1985 Johnson
4,538,916 A 9/1985 Zimmerman
4,601,629 A 7/1986 Zimmerman
4,676,063 A 6/1987 Goebel et al.
4,759,674 A 7/1988 Schröder et al.
4,768,884 A 9/1988 Elkin et al.
4,793,386 A 12/1988 Sloan
4,845,981 A 7/1989 Pearson
4,922,463 A 5/1990 Del Zotto et al.
5,004,400 A 4/1991 Handke
5,006,044 A 4/1991 Walker, Sr. et al.
5,025,861 A 6/1991 Huber et al.
5,050,673 A 9/1991 Baldridge
5,114,239 A 5/1992 Allen
5,130,628 A 7/1992 Owen
5,131,472 A 7/1992 Dees et al.
5,172,009 A 12/1992 Mohan
5,189,388 A 2/1993 Mosley et al.
5,230,366 A 7/1993 Marandi
5,334,899 A 8/1994 Skybyk
5,366,324 A 11/1994 Arlt
5,422,550 A 6/1995 McClanahan et al.
5,433,243 A 7/1995 Griswold et al.
5,439,066 A 8/1995 Gipson
5,486,047 A 1/1996 Zimmerman
5,517,822 A 5/1996 Haws et al.
5,548,093 A 8/1996 Sato et al.
5,590,976 A 1/1997 Kilheffer et al.
5,655,361 A 8/1997 Kishi
5,736,838 A 4/1998 Dove et al.
5,755,096 A 5/1998 Holleyman
5,790,972 A 8/1998 Kohlenberger
5,798,596 A 8/1998 Lordo
5,813,455 A 9/1998 Pratt et al.
5,865,247 A 2/1999 Paterson
5,879,137 A 3/1999 Yie
5,894,888 A 4/1999 Wiemers et al.
5,907,970 A 6/1999 Havlovick et al.
5,950,726 A 9/1999 Roberts
6,007,227 A 12/1999 Carlson
6,035,265 A 3/2000 Dister et al.
6,097,310 A 8/2000 Harrell et al.
6,121,705 A 9/2000 Hoong
6,138,764 A 10/2000 Scarsdale et al.
6,142,878 A 11/2000 Barin
6,164,910 A 12/2000 Mayleben
6,202,702 B1 3/2001 Ohira et al.
6,208,098 B1 3/2001 Kume et al.
6,254,462 B1 7/2001 Kelton et al.
6,271,637 B1 8/2001 Kushion
6,273,193 B1 8/2001 Hermann et al.
6,315,523 B1 11/2001 Mills
6,442,942 B1 9/2002 Kopko
6,477,852 B2 11/2002 Dodo et al.
6,484,490 B1 11/2002 Olsen et al.
6,491,098 B1 12/2002 Dallas
6,529,135 B1 3/2003 Bowers et al.
6,585,455 B1 7/2003 Petersen et al.
6,626,646 B2 9/2003 Rajewski
6,719,900 B2 4/2004 Hawkins
6,765,304 B2 7/2004 Baten et al.
6,776,227 B2 8/2004 Beida et al.
6,788,022 B2 9/2004 Sopko et al.
6,802,690 B2 10/2004 Han et al.
6,808,303 B2 10/2004 Fisher
6,931,310 B2 8/2005 Shimizu et al.
6,936,947 B1 8/2005 Leijon et al.
6,985,750 B1 1/2006 Vicknair et al.
7,082,993 B2 8/2006 Ayoub et al.
7,104,233 B2 9/2006 Ryczek
7,170,262 B2 1/2007 Pettigrew
7,173,399 B2 2/2007 Sihler et al.
7,308,933 B1 12/2007 Mayfield
7,312,593 B1 12/2007 Streicher et al.
7,336,514 B2 2/2008 Amarillas et al.
7,445,041 B2 11/2008 O'Brien
7,494,263 B2 2/2009 Dykstra et al.
7,500,642 B2 3/2009 Cunningham et al.
7,525,264 B2 4/2009 Dodge
7,563,076 B2 7/2009 Brunet et al.
7,581,379 B2 9/2009 Yoshida et al.
7,675,189 B2 3/2010 Grenier
7,683,499 B2 3/2010 Saucier
7,717,193 B2 5/2010 Egilsson et al.
7,755,310 B2 7/2010 West et al.
7,795,830 B2 9/2010 Johnson
7,807,048 B2 10/2010 Collette
7,835,140 B2 11/2010 Mori et al.
7,845,413 B2 12/2010 Shampine et al.
7,926,562 B2 4/2011 Poitzsch et al.
7,977,824 B2 7/2011 Halen et al.
7,984,757 B1 7/2011 Keast et al.
8,037,936 B2 10/2011 Neuroth et al.
8,054,084 B2 11/2011 Schulz et al.
8,083,504 B2 12/2011 Williams et al.
8,091,928 B2 1/2012 Carrier et al.
8,096,354 B2 1/2012 Poitzsch
8,096,891 B2 1/2012 Lochtefeld et al.
8,139,383 B2 3/2012 Efraimsson et al.
8,146,665 B2 4/2012 Neal
8,154,419 B2 4/2012 Daussin et al.
8,232,892 B2 7/2012 Overholt et al.

(56) References Cited

U.S. PATENT DOCUMENTS 8,261,528 B2 9/2012 Chillar et al.
8,272,439 B2 9/2012 Strickland
8,310,272 B2 11/2012 Quarto
8,354,817 B2 1/2013 Yeh et al.
8,474,521 B2 7/2013 Kajaria et al.
8,506,267 B2 8/2013 Gambier et al.
8,534,235 B2 9/2013 Chandler
8,573,303 B2 11/2013 Kerfoot
8,596,056 B2 12/2013 Woodmansee et al.
8,616,005 B1 12/2013 Cousino, Sr.
8,616,274 B2 12/2013 Belcher et al.
8,646,521 B2 2/2014 Bowen
8,692,408 B2 4/2014 Zhang et al.
8,727,068 B2 5/2014 Bruin
8,760,657 B2 6/2014 Pope et al.
8,763,387 B2 7/2014 Schmidt
8,774,972 B2 7/2014 Rusnak et al.
8,789,601 B2 7/2014 Broussard et al.
8,795,525 B2 8/2014 Mcginnis et al.
8,800,652 B2 8/2014 Bartko et al.
8,807,960 B2 8/2014 Stephenson et al.
8,838,341 B2 9/2014 Kumano
8,851,860 B1 10/2014 Mail
8,857,506 B2 10/2014 Stone, Jr. et al.
8,899,940 B2 12/2014 Leugemors et al.
8,905,056 B2 12/2014 Kendrick
8,905,138 B2 12/2014 Lundstedt et al.
8,997,904 B2 4/2015 Cryer et al.
9,018,881 B2 4/2015 Mao et al.
9,051,822 B2 6/2015 Ayan et al.
9,051,923 B2 6/2015 Kuo
9,061,223 B2 6/2015 Winborn
9,062,545 B2 6/2015 Roberts et al.
9,067,182 B2 6/2015 Nichols et al.
9,103,193 B2 8/2015 Coli et al.
9,119,326 B2 8/2015 Mcdonnell et al.
9,121,257 B2 9/2015 Coli et al.
9,140,105 B2 9/2015 Pattillo
9,140,110 B2 9/2015 Coli et al.
9,160,168 B2 10/2015 Chapel et al.
9,169,706 B2 * 10/2015 Kellam, III ......... E21B 43/2607
9,260,253 B2 2/2016 Naizer et al.
9,322,239 B2 4/2016 Angeles Boza et al.
9,324,049 B2 4/2016 Thomeer et al.
9,340,353 B2 5/2016 Oren et al.
9,353,593 B1 5/2016 Lu et al.
9,366,114 B2 6/2016 Coli et al.
9,410,410 B2 8/2016 Broussard et al.
9,450,385 B2 9/2016 Kristensen
9,475,020 B2 10/2016 Coli et al.
9,475,021 B2 10/2016 Coli et al.
9,482,086 B2 11/2016 Richardson et al.
9,499,335 B2 11/2016 Mciver et al.
9,506,333 B2 11/2016 Castillo et al.
9,513,055 B1 12/2016 Seal
9,534,473 B2 * 1/2017 Morris .................... F01D 25/30
9,562,420 B2 2/2017 Morris et al.
9,587,649 B2 3/2017 Oehring
9,611,728 B2 4/2017 Oehring
9,650,871 B2 5/2017 Oehring et al.
9,650,879 B2 5/2017 Broussard et al.
9,706,185 B2 7/2017 Ellis
9,728,354 B2 8/2017 Skolozdra et al.
9,738,461 B2 8/2017 Degaray et al.
9,739,546 B2 8/2017 Bertilsson et al.
9,745,840 B2 8/2017 Oehring et al.
9,790,858 B2 10/2017 Kanebako
9,840,901 B2 12/2017 Oehring et al.
9,845,210 B2 12/2017 Oren et al.
9,863,228 B2 1/2018 Shampine et al.
9,893,500 B2 2/2018 Oehring et al.
9,909,398 B2 3/2018 Pham
9,915,128 B2 3/2018 Hunter
9,932,799 B2 4/2018 Symchuk
9,945,365 B2 4/2018 Hernandez et al.
9,963,961 B2 5/2018 Hardin
9,970,278 B2 5/2018 Broussard et al.
9,976,351 B2 5/2018 Randall
9,995,218 B2 6/2018 Oehring et al.
10,008,880 B2 6/2018 Mcknair et al.
10,020,711 B2 7/2018 Oehring et al.
10,036,238 B2 7/2018 Oehring
10,107,086 B2 10/2018 Oehring et al.
10,119,381 B2 11/2018 Oehring et al.
10,184,465 B2 1/2019 Enis et al.
10,196,878 B2 2/2019 Hunter
10,221,639 B2 3/2019 Romer et al.
10,227,854 B2 3/2019 Glass
10,232,332 B2 3/2019 Oehring et al.
10,246,984 B2 4/2019 Payne et al.
10,254,732 B2 4/2019 Oehring et al.
10,260,327 B2 4/2019 Kajaria et al.
10,280,724 B2 5/2019 Hinderliter
10,287,873 B2 5/2019 Filas et al.
10,302,079 B2 5/2019 Kendrick
10,309,205 B2 6/2019 Randall
10,337,308 B2 7/2019 Broussard et al.
10,371,012 B2 8/2019 Davis et al.
10,378,326 B2 8/2019 Morris et al.
10,393,108 B2 8/2019 Chong et al.
10,407,990 B2 9/2019 Oehring et al.
10,408,030 B2 9/2019 Oehring et al.
10,408,031 B2 9/2019 Oehring et al.
10,415,332 B2 9/2019 Morris et al.
10,436,026 B2 10/2019 Ounadjela et al.
10,627,003 B2 4/2020 Dale et al.
10,648,270 B2 5/2020 Brunty et al.
10,648,311 B2 5/2020 Oehring et al.
10,669,471 B2 6/2020 Schmidt et al.
10,669,804 B2 6/2020 Kotrla et al.
10,686,301 B2 6/2020 Oehring et al.
10,695,950 B2 6/2020 Igo et al.
10,711,576 B2 7/2020 Bishop
10,731,561 B2 8/2020 Oehring et al.
10,740,730 B2 8/2020 Altamirano et al.
10,767,561 B2 9/2020 Brady
10,781,752 B2 9/2020 Kikkawa et al.
10,794,165 B2 10/2020 Fischer et al.
10,815,978 B2 10/2020 Glass
10,988,998 B2 4/2021 Fischer et al.
11,273,421 B2 * 3/2022 Stegemoeller ........ B01F 35/716
11,286,116 B2 3/2022 Teichrob et al.
11,745,155 B2 9/2023 Oehring et al.
2001/0000996 A1 5/2001 Grimland et al.
2002/0169523 A1 11/2002 Ross et al.
2003/0056514 A1 3/2003 Lohn
2003/0079875 A1 5/2003 Weng
2003/0138327 A1 7/2003 Jones et al.
2004/0040746 A1 3/2004 Niedermayr et al.
2004/0045703 A1 3/2004 Hooper et al.
2004/0102109 A1 5/2004 Cratty et al.
2004/0167738 A1 8/2004 Miller
2005/0061548 A1 3/2005 Hooper et al.
2005/0116541 A1 6/2005 Seiver
2005/0201197 A1 9/2005 Duell et al.
2005/0274508 A1 12/2005 Folk et al.
2006/0052903 A1 3/2006 Bassett
2006/0065319 A1 3/2006 Csitari
2006/0109141 A1 5/2006 Huang et al.
2007/0131410 A1 6/2007 Hill et al.
2007/0187163 A1 8/2007 Cone et al.
2007/0201305 A1 8/2007 Heilman et al.
2007/0226089 A1 9/2007 Degaray et al.
2007/0277982 A1 12/2007 Shampine et al.
2007/0278140 A1 12/2007 Mallett et al.
2008/0017369 A1 1/2008 Sarada
2008/0041596 A1 2/2008 Blount et al.
2008/0095644 A1 4/2008 Mantei et al.
2008/0112802 A1 5/2008 Orlando et al.
2008/0137266 A1 6/2008 Jensen et al.
2008/0164023 A1 7/2008 Dykstra et al.
2008/0202991 A1 * 8/2008 Meagher ............... C02F 11/147
210/85
2008/0208478 A1 8/2008 Ella et al.

(56) References Cited

U.S. PATENT DOCUMENTS

2008/0217024 A1 9/2008 Moore
2008/0257449 A1 10/2008 Weinstein et al.
2008/0264625 A1 10/2008 Ochoa
2008/0264649 A1 10/2008 Crawford
2008/0277120 A1 11/2008 Hickie
2009/0045782 A1 2/2009 Datta et al.
2009/0065299 A1 3/2009 Vito et al.
2009/0072645 A1 3/2009 Quere
2009/0078410 A1 3/2009 Krenek et al.
2009/0093317 A1 4/2009 Kajiwara et al.
2009/0095482 A1 4/2009 Surjaatmadja
2009/0145611 A1 6/2009 Pallini, Jr. et al.
2009/0153354 A1 6/2009 Duassin et al.
2009/0188181 A1 7/2009 Forbis et al.
2009/0200035 A1 8/2009 Bjerkreim et al.
2009/0260826 A1 10/2009 Sherwood et al.
2009/0308602 A1 12/2009 Bruins et al.
2010/0000508 A1 1/2010 Chandler
2010/0019574 A1 1/2010 Baldassarre et al.
2010/0038907 A1 2/2010 Hunt et al.
2010/0045109 A1 2/2010 Arnold
2010/0051272 A1 3/2010 Loree et al.
2010/0132949 A1 6/2010 Defosse et al.
2010/0146981 A1 6/2010 Motakef et al.
2010/0172202 A1 7/2010 Borgstadt
2010/0224365 A1 9/2010 Abad
2010/0250139 A1 9/2010 Hobbs et al.
2010/0293973 A1 11/2010 Erickson
2010/0303655 A1 12/2010 Scekic
2010/0322802 A1 12/2010 Kugelev
2011/0005757 A1 1/2011 Herbert
2011/0017468 A1 1/2011 Birch et al.
2011/0052423 A1 3/2011 Gambier et al.
2011/0061855 A1 3/2011 Case et al.
2011/0081268 A1 4/2011 Ochoa et al.
2011/0085924 A1 4/2011 Shampine et al.
2011/0110793 A1 5/2011 Leugemors et al.
2011/0166046 A1 7/2011 Weaver et al.
2011/0247878 A1 10/2011 Rasheed et al.
2011/0272158 A1 11/2011 Neal
2012/0018016 A1 1/2012 Gibson et al.
2012/0049625 A1 3/2012 Hopwood
2012/0063936 A1 3/2012 Baxter et al.
2012/0085541 A1 4/2012 Love et al.
2012/0112757 A1 5/2012 Vrankovic et al.
2012/0127635 A1 5/2012 Grindeland
2012/0127822 A1 5/2012 Noles, Jr.
2012/0150455 A1 6/2012 Franklin et al.
2012/0152716 A1 6/2012 Kikukawa et al.
2012/0205301 A1 8/2012 Mcguire et al.
2012/0205400 A1 8/2012 Degaray et al.
2012/0222865 A1 9/2012 Larson et al.
2012/0232728 A1 9/2012 Karimi et al.
2012/0247783 A1 10/2012 Berner, Jr. et al.
2012/0255734 A1 10/2012 Coli et al.
2013/0009469 A1 1/2013 Gillett
2013/0025706 A1 1/2013 Degaray et al.
2013/0048575 A1* 2/2013 Gruber ..................... C02F 1/24 210/207
2013/0051971 A1 2/2013 Wyse et al.
2013/0175038 A1 7/2013 Conrad
2013/0175039 A1 7/2013 Guidry
2013/0180722 A1 7/2013 Olarte Caro
2013/0189629 A1 7/2013 Chandler
2013/0199617 A1 8/2013 Degaray et al.
2013/0233542 A1 9/2013 Shampine et al.
2013/0255271 A1 10/2013 Yu et al.
2013/0284278 A1 10/2013 Winborn
2013/0284455 A1 10/2013 Kajaria et al.
2013/0299167 A1 11/2013 Fordyce et al.
2013/0306322 A1 11/2013 Sanborn et al.
2013/0317750 A1 11/2013 Hunter
2013/0341029 A1 12/2013 Roberts et al.
2013/0343858 A1 12/2013 Flusche
2014/0000899 A1 1/2014 Nevison
2014/0010671 A1 1/2014 Cryer et al.
2014/0054965 A1 2/2014 Jain
2014/0060658 A1 3/2014 Hains et al.
2014/0095114 A1 4/2014 Thomeer et al.
2014/0096974 A1 4/2014 Coli et al.
2014/0124162 A1 5/2014 Leavitt
2014/0138079 A1 5/2014 Broussard et al.
2014/0174717 A1 6/2014 Broussard et al.
2014/0219824 A1 8/2014 Burnette
2014/0238683 A1 8/2014 Korach et al.
2014/0246211 A1 9/2014 Guidry et al.
2014/0251623 A1 9/2014 Lestz et al.
2014/0255214 A1 9/2014 Burnette
2014/0277772 A1 9/2014 Lopez et al.
2014/0290768 A1 10/2014 Randle et al.
2014/0379300 A1 12/2014 Devine et al.
2015/0001161 A1* 1/2015 Wiemers ............ E21B 43/2607 210/201
2015/0027712 A1 1/2015 Vicknair et al.
2015/0053426 A1 2/2015 Smith et al.
2015/0068724 A1 3/2015 Coli et al.
2015/0068754 A1 3/2015 Coli et al.
2015/0075778 A1 3/2015 Walters et al.
2015/0083426 A1 3/2015 Lesko et al.
2015/0097504 A1 4/2015 Lamascus et al.
2015/0114652 A1 4/2015 Lestz et al.
2015/0136043 A1 5/2015 Shaaban et al.
2015/0144336 A1 5/2015 Hardin et al.
2015/0147194 A1 5/2015 Foote
2015/0159911 A1 6/2015 Holt
2015/0175013 A1 6/2015 Cryer et al.
2015/0176386 A1 6/2015 Castillo et al.
2015/0211512 A1 7/2015 Wiegman et al.
2015/0211524 A1 7/2015 Broussard et al.
2015/0217672 A1 8/2015 Shampine et al.
2015/0225113 A1 8/2015 Lungu et al.
2015/0233530 A1 8/2015 Sandidge
2015/0252661 A1 9/2015 Glass
2015/0300145 A1 10/2015 Coli et al.
2015/0300336 A1 10/2015 Hernandez et al.
2015/0314225 A1 11/2015 Parsons et al.
2015/0330172 A1 11/2015 Allmaras et al.
2015/0354322 A1 12/2015 Vicknair et al.
2016/0006311 A1 1/2016 Li
2016/0032703 A1 2/2016 Broussard et al.
2016/0102537 A1 4/2016 Lopez
2016/0105022 A1 4/2016 Oehring et al.
2016/0160889 A1 6/2016 Hoffman et al.
2016/0177675 A1 6/2016 Morris et al.
2016/0177678 A1 6/2016 Morris et al.
2016/0186531 A1 6/2016 Harkless et al.
2016/0208592 A1 7/2016 Oehring
2016/0208593 A1 7/2016 Coli et al.
2016/0208594 A1 7/2016 Coli et al.
2016/0208595 A1 7/2016 Tang et al.
2016/0221220 A1 8/2016 Paige
2016/0230524 A1 8/2016 Dumoit et al.
2016/0230525 A1 8/2016 Lestz et al.
2016/0230660 A1 8/2016 Zeitoun et al.
2016/0258267 A1 9/2016 Payne et al.
2016/0265457 A1 9/2016 Stephenson et al.
2016/0273328 A1 9/2016 Oehring
2016/0273456 A1 9/2016 Zhang
2016/0281484 A1 9/2016 Lestz et al.
2016/0290114 A1 10/2016 Oehring et al.
2016/0290563 A1 10/2016 Diggins
2016/0312108 A1 10/2016 Lestz et al.
2016/0319650 A1 11/2016 Oehring et al.
2016/0326853 A1 11/2016 Fredd et al.
2016/0326854 A1 11/2016 Broussard et al.
2016/0326855 A1 11/2016 Coli et al.
2016/0341281 A1 11/2016 Brunvold et al.
2016/0345387 A1 11/2016 Russomagno
2016/0348479 A1 12/2016 Oehring et al.
2016/0349728 A1 12/2016 Oehring et al.
2016/0369609 A1 12/2016 Morris et al.
2017/0016433 A1 1/2017 Chong et al.
2017/0021318 A1 1/2017 Mciver
2017/0022788 A1 1/2017 Oehring et al.

(56) References Cited

U.S. PATENT DOCUMENTS

2017/0022807 A1 1/2017 Dursun et al.
2017/0028368 A1 2/2017 Oehring et al.
2017/0030177 A1 2/2017 Oehring et al.
2017/0030178 A1 2/2017 Oehring et al.
2017/0036178 A1 2/2017 Coli et al.
2017/0036872 A1 2/2017 Wallace
2017/0037717 A1 2/2017 Oehring et al.
2017/0037718 A1 2/2017 Coli et al.
2017/0043280 A1 2/2017 Vankouwenberg
2017/0051732 A1 2/2017 Hernandez et al.
2017/0074076 A1 3/2017 Joseph et al.
2017/0082033 A1 3/2017 Wu et al.
2017/0096885 A1 4/2017 Oehring et al.
2017/0096889 A1 4/2017 Blanckaert et al.
2017/0104389 A1 4/2017 Morris et al.
2017/0114625 A1 4/2017 Norris et al.
2017/0115674 A1 4/2017 Lopez
2017/0130743 A1 5/2017 Anderson
2017/0138171 A1 5/2017 Richards et al.
2017/0145918 A1 5/2017 Oehring et al.
2017/0146189 A1 5/2017 Herman et al.
2017/0159570 A1 6/2017 Bickert
2017/0159654 A1 6/2017 Kendrick
2017/0175516 A1 6/2017 Eslinger
2017/0204852 A1 7/2017 Barnett, Jr.
2017/0212535 A1 7/2017 Shelman et al.
2017/0218727 A1 8/2017 Oehring et al.
2017/0218843 A1 8/2017 Oehring et al.
2017/0222409 A1 8/2017 Oehring et al.
2017/0226838 A1 8/2017 Ciezobka et al.
2017/0226839 A1 8/2017 Broussard et al.
2017/0226842 A1 8/2017 Omont et al.
2017/0234250 A1 8/2017 Janik
2017/0241221 A1 8/2017 Seshadri et al.
2017/0259227 A1 9/2017 Morris et al.
2017/0292513 A1 10/2017 Haddad et al.
2017/0313499 A1 11/2017 Hughes et al.
2017/0314380 A1 11/2017 Oehring et al.
2017/0314979 A1 11/2017 Ye et al.
2017/0328179 A1 11/2017 Dykstra et al.
2017/0369258 A1 12/2017 Degaray et al.
2017/0370639 A1 12/2017 Bardon et al.
2018/0028992 A1 2/2018 Stegemoeller et al.
2018/0038216 A1 2/2018 Zhang et al.
2018/0045331 A1 2/2018 Lopez et al.
2018/0090914 A1 3/2018 Johnson et al.
2018/0156210 A1 6/2018 Oehring et al.
2018/0181830 A1 6/2018 Luharuka et al.
2018/0183219 A1 6/2018 Oehring et al.
2018/0216455 A1 8/2018 Andreychuk et al.
2018/0238147 A1 8/2018 Shahri et al.
2018/0245428 A1 8/2018 Richards
2018/0258746 A1 9/2018 Broussard et al.
2018/0259080 A1 9/2018 Dale et al.
2018/0266217 A1 9/2018 Funkhouser et al.
2018/0266412 A1 9/2018 Stokkevåg et al.
2018/0274446 A1 9/2018 Oehring et al.
2018/0284817 A1 10/2018 Cook et al.
2018/0291713 A1 10/2018 Jeanson
2018/0298731 A1 10/2018 Bishop et al.
2018/0312738 A1 11/2018 Rutsch et al.
2018/0313677 A1 11/2018 Warren et al.
2018/0320483 A1 11/2018 Zhang et al.
2018/0343125 A1 11/2018 Clish et al.
2018/0363437 A1 12/2018 Coli et al.
2018/0363640 A1 12/2018 Kajita et al.
2018/0366950 A1 12/2018 Pedersen et al.
2019/0003329 A1 1/2019 Morris et al.
2019/0010793 A1 1/2019 Hinderliter
2019/0040727 A1 2/2019 Oehring et al.
2019/0063309 A1 2/2019 Davis
2019/0100989 A1 4/2019 Stewart et al.
2019/0112910 A1 4/2019 Oehring et al.
2019/0119096 A1 4/2019 Haile et al.
2019/0120024 A1 4/2019 Oehring et al.
2019/0128080 A1 5/2019 Ross et al.
2019/0128104 A1 5/2019 Graham et al.
2019/0145251 A1 5/2019 Johnson
2019/0154020 A1 5/2019 Glass
2019/0162061 A1 5/2019 Stephenson
2019/0169971 A1 6/2019 Oehring et al.
2019/0178057 A1 6/2019 Hunter
2019/0178235 A1 6/2019 Coskrey et al.
2019/0203567 A1 7/2019 Ross et al.
2019/0203572 A1 7/2019 Morris et al.
2019/0211661 A1 7/2019 Reckels et al.
2019/0226317 A1 7/2019 Payne et al.
2019/0245348 A1 8/2019 Hinderliter et al.
2019/0249527 A1 8/2019 Kraynek
2019/0257462 A1 8/2019 Rogers
2019/0292866 A1 9/2019 Ross et al.
2019/0292891 A1 9/2019 Kajaria
2019/0316447 A1 10/2019 Oehring et al.
2020/0040878 A1 2/2020 Morris
2020/0047141 A1 2/2020 Oehring et al.
2020/0088152 A1 3/2020 Alloin
2020/0095854 A1* 3/2020 Hinderliter ............... H02P 5/74
2020/0232454 A1 7/2020 Chretien et al.
2020/0325760 A1 10/2020 Markham
2020/0350790 A1 11/2020 Luft et al.
2022/0403723 A1 12/2022 Yeung

FOREIGN PATENT DOCUMENTS

CA 2482943 5/2011
CA 3050131 11/2011
CA 2955706 10/2012
CA 2966672 10/2012
CA 3000322 4/2013
CA 2787814 2/2014
CA 2833711 5/2014
CA 2978706 9/2016
CA 2944980 2/2017
CA 3006422 6/2017
CA 3018485 8/2017
CA 2964593 10/2017
CA 2849825 7/2018
CA 3067854 1/2019
CA 2919649 2/2019
CA 2919666 7/2019
CA 2797081 9/2019
CA 2945579 10/2019
CN 101977016 2/2011
CN 104117308 10/2014
CN 104196613 12/2014
CN 205986303 2/2017
CN 108049999 5/2018
CN 112196508 1/2021
JP 2004264589 9/2004
WO 2009046280 4/2009
WO 2014177346 11/2014
WO 2016144939 9/2016
WO 2016160458 10/2016
WO 2018044307 3/2018
WO 2018213925 11/2018
WO 2019210417 11/2019

OTHER PUBLICATIONS

"Process Burner" (https://www.cebasrt.com/productsloii-gaslprocess-burner) 06 Sep. 6, 2018 (Sep. 6, 2018), entire document, especially para (Burners for refinery Heaters).

Water and Glycol Heating Systems (https://www.heat-inc.com/wg-series-water-glycol-systems/) Jun. 18, 2018 (Jun. 18, 2018), entire document, especially WG Series Water Glycol Systems.

Albone, "Mobile Compressor Stations for Natural Gas Transmission Service," ASME 67-GT-33, Turbo Expo, Power for Land, Sea and Air, vol. 79887, p. 1-10, 1967.

Canadian Office Action dated Apr. 18, 2018 in related Canadian Patent Application No. 2,298,711.

Canadian Office Action dated Jun. 22, 2018 in related Canadian Patent Application No. 2,886,697.

(56) References Cited

OTHER PUBLICATIONS

Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action issued Aug. 31, 2020 in Candian Patent Application No. 2,944,980.
Canadian Office Action issued in Canadian Application No. 3,094,768 mailed Oct. 28, 2021.
Canadian Office Action issued Sep. 22, 2020 in Canadian Application No. 2,982,974.
Canadian Office Action issued Sep. 8, 2020 in Candian Patent Application No. 2,928,707.
Canadian Office Action mailed Aug. 17, 2020 in related CA Patent Application No. 2,944,968.
Canadian Office Action mailed Aug. 18, 2020 in related CA Patent Application No. 2,933,444.
Canadian Office Action mailed Jun. 20, 2019 in corresponding CA Application No. 2,964,597.
Canadian Office Action mailed May 30, 2019 in corresponding CA Application No. 2,833,711.
Canadian Office Action mailed Oct. 1, 2019 in related Canadian Patent Application No. 2,936,997.
Dan T. Ton & Merrill A. Smith, The U.S. Department of Energy's Microgrid Initiative, 25 The Electricity J. 84 (2012), pp. 84-94.
Final Office Action dated Mar. 31, 2020 corresponding to U.S. Appl. No. 15/356,436.
Final Office Action issued in corresponding U.S. Appl. No. 14/622,532 dated Dec. 21, 2015.
Final Office Action issued in corresponding U.S. Appl. No. 14/622,532 dated Dec. 7, 2016.
Final Office Action issued in corresponding U.S. Appl. No. 15/145,491 dated Jan. 20, 2017.
Final Office Action issued in corresponding U.S. Appl. No. 15/145,491 dated Sep. 6, 2017.
Final Office Action issued in corresponding U.S. Appl. No. 15/294,349 dated Jul. 6, 2017.
Final Office Action issued in U.S. Appl. No. 16/356,263 mailed Oct. 7, 2021.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Goodwin, "High-voltage auxiliary switchgear for power stations," Power Engineering Journal, 1989, 10 pg. (Year 1989).
International Search and Report and Written Opinion mailed Jan. 2, 2019 in related PCT Patent Application No. PCT/US18/54542.
International Search and Written Opinion Mailed Aug. 28, 2020 in PCT/US20/23821.
International Search report and Written Opinion dated Sep. 19, 2018 in related PCT Patent Application No. PCT/US2018/040683.
International Search Report and Written Opinion issued in PCT/US2020/023809 mailed Jun. 2, 2020.
International Search Report and Written Opinion mailed Apr. 10, 2019 in corresponding PCT Application No. PCT/US2019/016635.
International Search Report and Written Opinion mailed Dec. 14, 2020 in PCT/US2020/53980.
International Search Report and Written Opinion mailed Dec. 31, 2018 in related PCT Patent Application No. PCT/US18/55913.
International Search Report and Written Opinion mailed Feb. 11, 2020 in related PCT Application No. PCT/US2019/055323.
International Search Report and Written Opinion mailed Feb. 15, 2019 in related PCT Application No. PCT/US18/63977.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.
International Search Report and Written Opinion mailed in PCT/US/67526 mailed May 6, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US20/67528 mailed Mar. 19, 2021.
International Search Report and Written Opinion mailed in PCT/US20/67608 mailed Mar. 30, 2021.
International Search Report and Written Opinion mailed in PCT/US2020/066543 mailed May 11, 2021.
International Search Report and Written Opinion mailed Jan. 2, 2019 in related PCT Patent Application No. PCT/US18/54548.
International Search Report and Written Opinion mailed Jan. 2, 2020 in related PCT Application No. PCT/US19/55325.
International Search Report and Written Opinion mailed Jan. 4, 2019 in related PCT Patent Application No. PCT/US18/57539.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance and Notice of Allowability issued in U.S. Appl. No. 15/829,419 mailed Jul. 26, 2021.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice Of Allowance mailed Apr. 23, 2019 in corresponding U.S. Appl. No. 15/635,028.
Notice of Allowance mailed Jan. 9, 2020 in related U.S. Appl. No. 16/570,331.
Office Action dated Apr. 10, 2018 in related U.S. Appl. No. 15/294,349.
Office Action dated Apr. 2, 2018 in related U.S. Appl. No. 15/183,387.
Office Action dated Jul. 25, 2018 in related U.S. Appl. No. 15/644,487.
Office Action dated May 29, 2018 in related U.S. Appl. No. 15/235,716.
Office Action dated Oct. 4, 2018 in related U.S. Appl. No. 15/217,081.
Office Action mailed Aug. 19, 2019 in related U.S. Appl. No. 15/356,436.
Office Action mailed Aug. 4, 2020 in related U.S. Appl. No. 16/385,070.
Office Action mailed Dec. 12, 2018 in related U.S. Appl. No. 16/160,708.
Office Action mailed Jan. 30, 2019 in related Canadian Patent Application No. 2,936,997.
Office Action mailed Jun. 11, 2019 in corresponding U.S. Appl. No. 16/210,749.
Office Action mailed Jun. 22, 2020 in relate U.S. Appl. No. 16/377,861.
Office Action mailed Jun. 29, 2020 in related U.S. Appl. No. 16/728,359.
Office Action mailed Jun. 7, 2019 in corresponding U.S. Appl. No. 16/268,030.
Office Action mailed Mar. 1, 2019 in related Canadian Patent Application No. 2,943,275.
Office Action mailed May 10, 2019 in corresponding U.S. Appl. No. 16/268,030.
Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
Woodbury et al., "Electrical Design Considerations for Drilling Rigs," IEEE Transactions on Industry Applications, vol. 1A-12, No. 4, Jul./Aug. 1976, pp. 421-431.

(56) References Cited

OTHER PUBLICATIONS

USPTO, Non-Final Office Action issued in U.S. Appl. No. 16/404,283 on Mar. 7, 2024, 12 pages.
UK Power Networks , "Transformers to Supply Heat to Tate Modern", UK Power Networks, from press releases May 16, 2013.
International Search Report and Written Opinion mailed Jul. 22, 2020 in corresponding PCT Application No. PCT/US20/00017.
International Search Report and Written Opinion mailed Jul. 9, 2019 in corresponding PCT Application No. PCT/US2019/027584.
International Search Report and Written Opinion mailed Jun. 23, 2020 in corresponding PCT Application No. PCT/US20/23912.
International Search Report and Written Opinion mailed Mar. 5, 2019 in related PCT Application No. PCT/US18/63970.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
International Search Report and Written Opinion Mailed Sep. 3, 2020 in PCT/US2020/36932.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Kroposki et al., Making Microgrids Work, 6 IEEE Power and Energy Mag. 40, 41 (2008).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/622,532 dated May 17, 2016.
Non-Final Action issued in corresponding U.S. Appl. No. 15/293,681 dated Feb. 16, 2017.
Non-Final Office Action dated Mar. 3, 2020 corresponding to U.S. Appl. No. 16/152,695.
Non-Final Office Action dated Oct. 4, 2018 in related U.S. Appl. No. 15/217,081.
Non-Final Office Action issue din corresponding U.S. Appl. No. 15/291,842 dated Jan. 6, 2017.
Non-Final Office Action issued in corresponding U.S. Appl. No. 14/622,532 dated Aug. 5, 2015.
Non-Final Office Action issued in corresponding U.S. Appl. No. 14/884,363 dated Sep. 5, 2017.
Non-Final Office Action issued in corresponding U.S. Appl. No. 15/145,443 dated Feb. 7, 2017.
Non-Final Office Action issued in Corresponding U.S. Appl. No. 15/145,491 on May 15, 2017.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/294,349 dated Mar. 14, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Non-Final Office Action issued in U.S. Appl. No. 14/881,525 mailed Jul. 21, 2021.
Non-Final Office Action issued in U.S. Appl. No. 16/404,283 mailed Jul. 21, 2021.
Non-Final Office Action issued in U.S. Appl. No. 16/871,928 mailed Aug. 25, 2021.
Non-Final Office Action issued in U.S. Appl. No. 16/901,774 mailed Sep. 14, 2021.
Non-Final Office Action issued in U.S. Appl. No. 16/943,727 mailed Aug. 3, 2021.
Non-Final Office Action issued in U.S. Appl. No. 17/060,647 mailed Sep. 20, 2021.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
Non-Final Office Action issued in U.S. Appl. No. 16/564,186, mailed Oct. 15, 2021.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued Nov. 13, 2017 in related U.S. Appl. No. 15/644,487.
Non-Final Office Action issued Nov. 29, 2017 in related U.S. Appl. No. 15/145,414.
Non-Final Office Action issued Oct. 6, 2017 in related U.S. Appl. No. 14/881,535.
Non-Final Office action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Dec. 6, 2019 in related U.S. Appl. No. 16/564,186.
Non-final Office Action mailed Feb. 12, 2019 in related U.S. Appl. No. 16/170,695.
Non-Final Office Action mailed Feb. 25, 2019 in related U.S. Appl. No. 16/210,749.
Non-Final Office Action mailed Jan. 10, 2020 in related U.S. Appl. No. 16/597,014.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action mailed Mar. 6, 2019 in related U.S. Appl. No. 15/183,387.
Baldor Reliance , "Product Information Packet CECP3665T", 2023, 13 pages.
Cherry-Burrell, Waukesha , "Universal® 1 Series Rotary Positive Displacement Pumps", 2019, 12 pages.
LS Electric , "Fan and Pump Drive H100", 2020, 84 pages.
USPTO, Notice of Allowance issued in U.S. Appl. No. 18/665,940 on Mar. 18, 2025, 82 pages.
U.S. Court of Appeals for the Federal Circuit Opinion, *U.S. Well Services, LLC,* v. *Coke Morgan Stewart,* Case No. 2023-1799, issued Mar. 13, 2025, 5 pages, 5 pages.
USPTO, Non-Final Office Action issued in U.S. Appl. No. 18/789,345 on Jun. 24, 2025, 110 pages.
USPTO, Final Office Action issued in U.S. Appl. No. 18/789,345 on Oct. 14, 2025, 41 pages.
USPTO, Non-Final Office Action issued in U.S. Appl. No. 18/789,345 on Mar. 3, 2026, 31 pages.

* cited by examiner

HYDRAULIC FRACTURING EQUIPMENT WITH NON-HYDRAULIC POWER

CROSS REFERENCE TO RELATED APPLICATIONS

This application is a continuation of U.S. patent application Ser. No. 16/404,283, filed May 6, 2019, which is a continuation of U.S. patent application Ser. No. 15/644,487, filed Jul. 7, 2017, which is now U.S. Pat. No. 10,280,724 issued May 7, 2019, the full disclosures of which are hereby incorporated by reference herein for all purposes.

BACKGROUND

1. Technical Field

This disclosure relates generally to hydraulic fracturing and more particularly to systems and methods for ancillary components of hydraulic fracturing equipment powered by non-hydraulic electric motors.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Historically, large diesel motors have been used for drive power in hydraulic fracturing systems, while a system of hydraulics is typically used to drive smaller ancillary devices such as augers, chemical pumps, mixing paddles, water pumps, and cooling fans. For example, hydraulic power can include use of pressure and flow of hydraulic oil as a power source for turning valves, rotating fans and blowers, or spinning pumps to displace fracturing slurry, proppant, or chemicals onboard individual pieces of ancillary equipment. The use of hydraulics to power such ancillary elements of the hydraulic fracturing system includes several disadvantages, however.

For example, a fundamental drawback of using hydraulics to operate a chemical pump is the irregularity of the control system. Typically a proportional valve is used to regulate the flow of hydraulic fluid from a hydraulic pump to a hydraulic motor used to drive a chemical pump. Combined with a proportional-integral-derivative (PID) loop control system, a chemical pump with a hydraulic motor can be controlled accurately within a given range of fluid rate. However, the upper rate (pump speed) can be influenced by the charge pressure of the hydraulic system, which can fluctuate based on how heavily the entire hydraulic system is being used or by the level of power of the drive motor powering the hydraulic pumps for the charge pressure. Every time a new chemical pump or auger is turned on, the charge pressure will at least temporarily drop, which can cause an undesirable fluctuation in the speed of operation of each chemical pump.

Another common problem with using hydraulic motors to power chemical pumps may occur when an operator attempts to run a chemical pump too slowly. For example, a normal progressive cavity chemical pump rated for a maximum of 15 gallons per minute (gpm) will not operate smoothly below 2 gpm due to the inability of the PID controller and proportional valve to properly regulate the flow of hydraulic fluid at such a low setting. This lower operability limit can cause the pump to surge on and off, resulting in the addition of an incorrect amount of chemicals to the fracturing slurry. In many instances, this problem is dealt with by installing multiple chemical pumps of different sizes (max fluid rates), such that different chemicals can be run accurately at different speeds (fluid rates). The myriad of different chemical pumps must be preplanned and installed before commencing hydraulic fracturing operations, often based on customer requirements, or alternatively several extra chemical pumps must be installed at all times to allow for the flexibility required during fracturing operations, either of which results in inefficiencies in operation and cost.

Reliability can also be a problem with hydraulic circuits. A single failure in a hydraulic hose or hydraulic pump can cause every hydraulic motor attached to that circuit to fail. Hydraulic systems also have filters which can clog or leak, dry rotted hoses that can fail, fittings that can leak or fail, pumps that can overheat, and fluid that can thicken and "gel up" in the winter, which requires heaters to be installed in the hydraulic fluid reservoir. Moreover, hot, pressurized hydraulic fluid has been known to injure workers, is contaminating to the environment, and is heavy, thereby adding to the weight of the mobile trailer on which the ancillary equipment is situated at a hydraulic fracturing site. Hydraulic fluid also requires dedicated radiators, which represent another point of possible failure and which take up valuable space at the hydraulic fracturing operation drill pad and add noise pollution.

Thus, it may be desirable to modify hydraulic fracturing systems to power ancillary units, such as blenders and chemical pumps, with a non-hydraulic power source.

SUMMARY

With the creation of the electrical microgrid for electrical hydraulic fracturing equipment, electric motors can now easily be used anywhere mechanical rotation is required. Previously, large diesel motors were used for drive power in hydraulic fracturing systems, while a system of hydraulics were used to power smaller ancillary devices such as augers, chemical pumps, mixing paddles, water pumps, and cooling fans.

The present disclosure is directed to a system and method for powering ancillary units associated with a hydraulic fracturing system, such as blenders and pumps, with a non-hydraulic power source. In particular, the present disclosure is directed to use of a plurality of electric motors to operate each ancillary unit in a hydraulic fracturing system.

In accordance with an aspect of the disclosed subject matter, the method and system of the present disclosure provide a hydraulic fracturing system for fracturing a subterranean formation. In an embodiment, the system can include an electric pump fluidly connected to a well associated with the subterranean formation and configured to pump fluid into a wellbore associated with the well at a high pressure so that the fluid passes from the wellbore into the subterranean formation and fractures the subterranean formation; one or more ancillary units associated with the fluid pumped into the wellbore; a first motor electrically coupled to the electric pump to operate the electric pump; and one or more second motors, each of the one or more second motors electrically coupled to at least one of the one or more ancillary units to operate the at least one of the one or more ancillary units.

In an embodiment, the first motor can be selected from the group including any of an electric motor, a diesel motor, a natural gas motor, a gasoline motor, and a hydraulic motor, or a combination thereof.

In an embodiment, the system can further include an electric generator, where the first motor can be electrically coupled to the electric pump via the electric generator to generate electricity for use by the electric pump.

In an embodiment, the one or more second motor can include an electric motor.

In an embodiment, the electric motor can be selected from the group including any of a single-phase AC motor, a three-phase motor, and a DC motor.

In an embodiment, the hydraulic fracturing system can further include a plurality of variable-frequency drives (VFD), and each VFD can be connected to at least one of the first motor or the one or more second motors to control the speed of the first motor or the one or more second motors.

In an embodiment, each VFD can frequently perform electric motor diagnostics to prevent damage to the first motor or the one or more second motors.

In an embodiment, the system can further include one or more trailer, where the one or more ancillary units can be positioned on the one or more trailers, and where each VFD can be positioned on the one or more trailer proximate each of the one or more ancillary units.

In an embodiment, the one or more second motors can each be positioned on the one or more trailers proximate each of the one or more ancillary units.

In an embodiment, the one or more ancillary units can be selected from the group including any of a blender, a hydration unit, a chemical additive unit, a small pump, a chemical pump, a water pump, a valve actuator, a cooling fan, an auger, a mixing paddle, a conveyor belt, and a blower, or any combination thereof.

In an embodiment, the one or more ancillary units can include a blender, the blender being positioned on a trailer and fluidly connected to an auger. In an embodiment, the one or more second motors can be positioned any of proximate a top elevation of the auger or proximate a bottom elevation of the auger, or a combination thereof, such that the one or more second motors can provide power to drive the auger.

In an embodiment, the one or more ancillary units can include a hydration unit, the hydration unit being positioned on a trailer, and the trailer further including a VFD. In an embodiment, the one or more second motors can be positioned any of between the hydration unit and the VFD, or below the VFD, or a combination thereof, and the one or more second motors can provide power to the hydration unit via the VFD.

The present disclosure is also directed to a hydraulic fracturing system for fracturing a subterranean formation. In an embodiment, the system can include an electric pump fluidly connected to a well associated with the subterranean formation, and configured to pump fluid into a wellbore associated with the well at a high pressure so that the fluid passes from the wellbore into the subterranean formation and fractures the subterranean formation. In an embodiment, the system can further include one or more ancillary units associated with the fluid pumped into the wellbore. In an embodiment, the system can further include a first motor electrically coupled to the electric pump to operate the electric pump. In an embodiment, the system can further include one or more second motors, the one or more second motors including an electric motor, and each of the one or more second motors electrically coupled to at least one of the one or more ancillary units to operate the at least one of the one or more ancillary units. In an embodiment, the system can further include a plurality of variable-frequency drives (VFD), each VFD connected to at least one of the first motor or the one or more second motors to control the speed of the first motor or the one or more second motors.

The present disclosure is further directed to a method for powering one or more ancillary units associated with a hydraulic fracturing system. In an embodiment, the method can include fluidly connecting an electric pump to a well associated with a subterranean formation, the electric pump configured to pump fluid into a wellbore associated with the well at a high pressure so that the fluid passes from the wellbore into the subterranean formation and fractures the subterranean formation. In an embodiment, the method can further include fluidly connecting the one or more ancillary units with the fluid pumped into the wellbore, and electrically coupling a first motor to the electric pump to operate the electric pump. In an embodiment, the method can further include electrically coupling one or more second motors to each of the one or more ancillary units to operate the one or more ancillary units, the one or more second motors comprising an electric motor; and connecting each of a plurality of variable-frequency drives (VFD) to at least one of the first motor or the one or more second motors to control the speed of the first motor or the one or more second motors.

The use of electric motors, rather than hydraulic pumps, to power the ancillary units of a hydraulic fracturing system has many advantages. For example, small electrical motors with small variable-frequency drives (VFDs) are able to spin steadily at any speed up to their maximum designed rotations per minute (RPM), unlike hydraulic pumps, which may operate at irregular speeds or be limited to higher speeds, as discussed above. The use of electric motors can allow operators to install a single type of chemical pump or auger motor and accurately control the pump or motor regardless of desired rates and job designs, rather than requiring installation of multiple pumps for operation at multiple settings, as would be required with hydraulic motors.

Additionally, without the use of hydraulic pumps, all hydraulic fluid can be eliminated; this has several advantages. Preventing spills of contaminating fluids has become a very high priority in the industry, and hydraulic oil is one of the most commonly spilled fluids on well stimulation sites due to blown hoses, leaking seals, changing filters, changing pumps and motors, overfilled reservoirs, or oil transfers from buckets and totes. Requiring spare totes of hydraulic oil and replacement hydraulic filters, as well as spare parts for JIC fittings, hydraulic hoses, and gauges, may no longer be necessary with the use of electric motors. The use of electric power, rather than hydraulic power, also promotes a "greener" image of environmental responsibility, at least because electric motors save time and money over hydraulic pumps, as maintenance time is greatly reduced.

Weight reduction is another advantage of using electric motors rather than hydraulic pumps. Without the need for hydraulic oil, the reservoir, filters and filter houses, hoses, pumps, motors, ball valves, racks of gauges, and electronically controlled proportional valves can all be removed from ancillary unit trailers, and can be replaced with comparatively small and light-weight three-phase, 600V electric motors, power cables, and small VFDs.

The most obvious and notable change will be the elimination of the single large electric motor (HPU), which is used to drive the multitude of hydraulic pumps in existing hydraulic fracturing systems that utilize hydraulic pumps to power the ancillary units. Typical HPUs operate in "on" and "off" settings only, and the speed is not adjustable. While this setup eliminates the need for a large and expensive VFD, since a simple soft starter is used, the HPU is very inefficient in power usage. Regardless of the hydraulic power that is used, if only a single chemical pump is being used or if all chemical pumps, boost pumps, and valves are being utilized, the electric drive motor for the hydraulics must be on and at full speed in order to rotate the hydraulic pumps. This constant operation leads to decreased efficiency, and increased costs and noise pollution.

With the HPU removed, the associated air cooling blower often positioned on top of the HPU can also be removed, further saving space, electrical power, the possibility of a single failure point—where one failed part can cripple the entire system—and reducing noise, as the blower motors are often the most prominent source of noise in the hydraulic fracturing fleet.

With the elimination of hydraulics-based power, up to three HPU motors and associated blower motors can be removed from each typical fleet. The reduction in noise associated with this removal may be most noticeable during times where the fracturing pumps, mixing equipment, and turbine generators are in a standby or low-load state. This accounts for approximately 50% of the time during well stimulation activities and occurs during wireline pump downs, injection tests, pressure tests, and at the beginning of fracturing stages.

The elimination of the HPU motor can also allow the auxiliary trailer to be reduced in size, or eliminated entirely, as a result of the extra space created on the ancillary unit trailers. Extra space is also created on the ancillary equipment, due to the removal of the hydraulic cooling fans, HPU motor, HPU cooling system, hydraulic pumps, hydraulic pump enclosure, hydraulic oil reservoir, and proportional valve bank, and surrounding deck space required for maintenance and monitoring of the hydraulic system. Removing these hydraulic power-related units frees up the entire tongue of the trailer on which the ancillary equipment is situated, and several feet onto the drop portion of the trailer chassis. In this space, it is possible to install a VFD housing similar to one that is installed on the fracturing pump trailers. For example, the blender VFD housing can contain a motor control center (MCC) for control of all electrically powered chemical pumps, proppant augers, paddles, water pumps, and blower motors for the discharge pump's large electric motor (known as the SPU). Lighting control, power cable connections, and the SPU VFD drive can all be housed on the blenders and hydration units, and can be removed from the auxiliary trailer. Placing these components on the ancillary equipment will allow the one or two auxiliary trailers commonly included in hydraulic fracturing operations to be drastically reduced in size or completely eliminated altogether, thereby reducing the overall footprint required for the well site.

Removing the hydraulic pumps can also eliminate the need for hydraulic heating. This includes immersion heaters or any other electric or residual heating elements, and can further save electrical power and space required for breakers, cables, or any additional voltage transformers.

An additional advantage to eliminating hydraulic power for ancillary units in a hydraulic fracturing system is the reduction of interconnecting cables between the ancillary mixing equipment (e.g., blender, hydration unit) and the auxiliary trailer. These cables are often the limiting factor that dictates the placement of the equipment on site, in that the ancillary equipment can only be positioned as far from the auxiliary trailer as the associated cables will reach, while the auxiliary trailer can only be as far from the switchgear as the associated cable will reach. Oftentimes the desired equipment placement is not possible due to one piece of equipment having cables that are too short. Producing longer power and communication cables is expensive as well as inefficient, as power losses and signal degradation become limiting factors with cable length.

If all VFDs, soft starters, and breakers can be placed on the hydration and blender units, or other ancillary hydraulic fracturing equipment, then up to ten interconnecting cables per blender and four interconnecting cables per hydration unit can be removed, allowing for the fleet-wide reduction of up to 24 power and signal cables, for example. These interconnecting cables are a contributor to longer rig-in and rig-out times experienced on the electric fleets as compared to diesel fleets. These cables also require an enclosed trailer to transport the cables between well pads, resulting in an increased risk of failure and damage every time the cables are disconnected and stowed for transport. Eliminating these cables and connections will save time and reduce cable costs, and will increase fleet-wide reliability.

Other aspects and features of the present disclosure will become apparent to those of ordinary skill in the art after reading the detailed description herein and the accompanying figures.

BRIEF DESCRIPTION OF DRAWINGS

Some of the features and benefits of the present disclosure having been stated, others will become apparent as the description proceeds when taken in conjunction with the accompanying drawings, in which.

Figure 1:
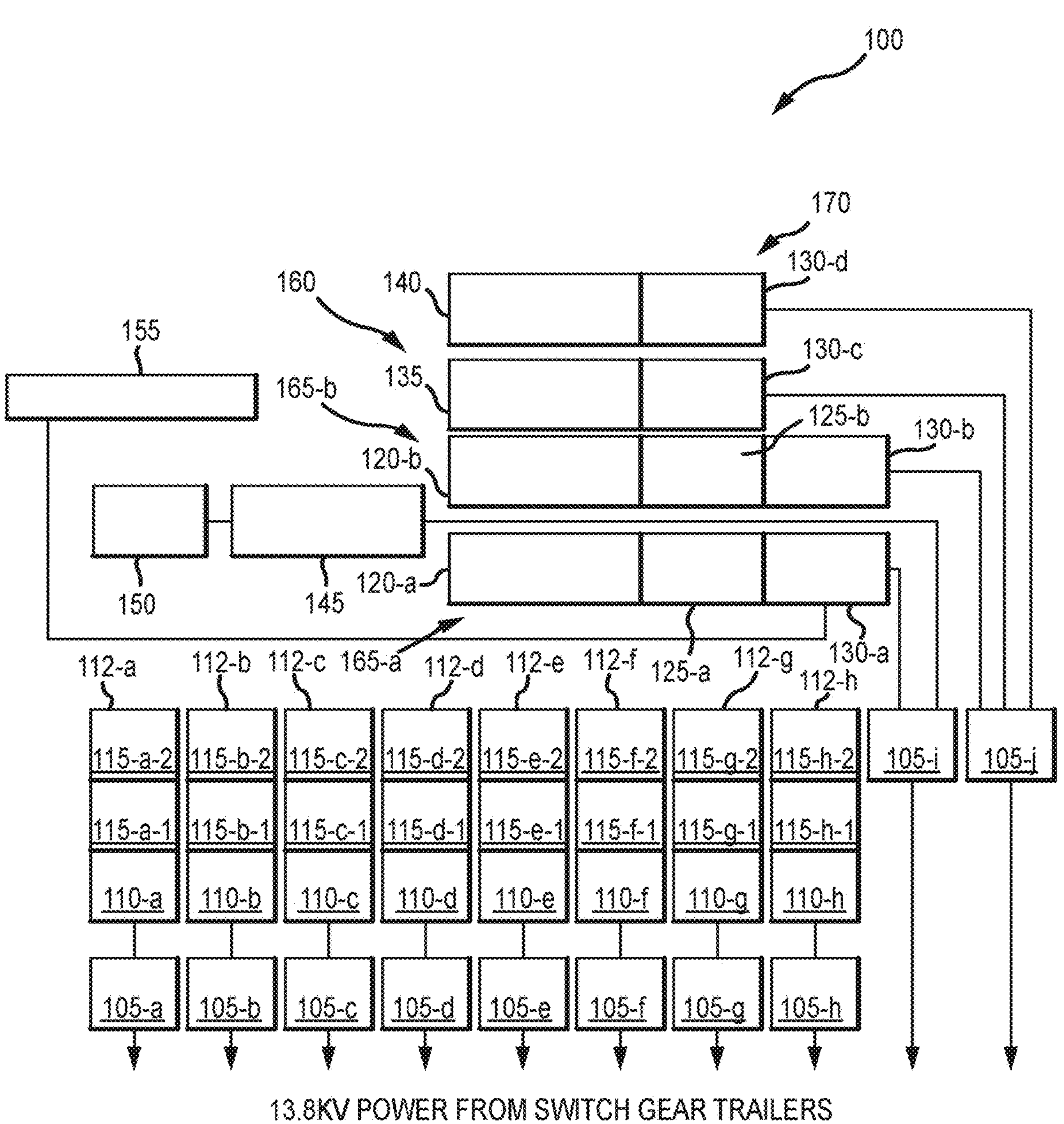
FIG. 1 is an overhead schematic diagram of a physical arrangement of components of a hydraulic fracturing system at a well site, according to an embodiment.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and systems of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein are example methods and systems for powering ancillary units of a hydraulic fracturing system with electric power.

FIG. 1 shows an overhead schematic view of an example of a hydraulic fracturing system 100 arrangement at a well site, according to an embodiment. In the illustrated example, up to about 13.8 kV or more of power can be supplied from a plurality of switchgear trailers (not shown) to a plurality of transformers 105-*a*, 105-*b*, 105-*c*, 105-*d*, 105-*e*, 105-*f*, 105-*g*, 105-*h*. The transformers 105-*a*, 105-*b*, 105-*c*, 105-*d*, 105-*e*, 105-*f*, 105-*g*, 105-*h* can supply power at a stepped-down voltage of down to about 600V or less to a plurality of variable-frequency drive (VFD) houses 110-*a*, 110-*b*, 110-*c*, 110-*d*, 110-*e*, 110-*f*, 110-*g*, 110-*h*. The VFD housings 110-*a*, 110-*b*, 110-*c*, 110-*d*, 110-*c*, 110-*f*, 110-*g*, 110-*h* can in turn control power provided to a plurality of fracturing pumps 115-*a*-1, 115-*a*-2, 115-*b*-1, 115-*b*-2, 115-*c*-1, 115-*c*-2, 115-*d*-1, 115-*d*-2, 115-*e*-1, 115-*e*-2, 115-*f*-1, 115-*f*-2, 115-*g*-1, 115-*g*-2, 115-*h*-1, 115-*h*-2.

Each of the transformers, VFD housings, and fracturing pumps can be housed on a plurality of fracturing pump trailers 112-*a*, 112-*b*. 112-*c*, 112-*d*, 112-*e*, 112-*f*, 112-*g*, 112-*h*, arranged parallel with respect to each other, as in the illustrated embodiment. In other embodiments, the plurality of trailers may be arranged perpendicularly, in series, or in any other arrangement suitable for the hydraulic fracturing operation. In some embodiments, each VFD housing 110-*a*, 110-*b*, 110-*c*, 110-*d*, 110-*e*, 110-*f*, 110-*g*, 110-*h* is positioned on a trailer with two fracturing pumps 115-*a*-1, 115-*a*-2, 115-*b*-1, 115-*b*-2, 115-*c*-1, 115-*c*-2, 115-*d*-1, 115-*d*-2, 115-*e*-1, 115-*e*-2, 115-*f*-1, 115-*f*-2, 115-*g*-1, 115-*g*-2, 115-*h*-1, 115-*h*-2 positioned thereon, while the transformers 105-*a*, 105-*b*, 105-*c*, 105-*d*, 105-*e*, 105-*f*, 105-*g*, 105-*h* are positioned on separate trailers. In other embodiments, other combinations of transformers, VFD housings, and fracturing pumps can be arranged on one or more trailers. Although illustrated in FIG. 1 as having eight sets of transformers, VFD housings, and fracturing pumps, in other embodiments, any of 1, 2, 3, 4, 5, 6, 7, 9, 10 or more of each element can be included in the hydraulic fracturing system 100.

In some embodiments, fracturing pumps 115-*a*-1, 115-*a*-2, 115-*b*-1, 115-*b*-2, 115-*c*-1, 115-*c*-2, 115-*d*-1, 115-*d*-2, 115-*e*-1, 115-*e*-2, 115-*f*-1, 115-*f*-2, 115-*g*-1, 115-*g*-2, 115-*h*-1, 115-*h*-2 can include diesel or dual-fuel fracturing pumps, which can be used to supplement an electric fleet. For example, the diesel or dual-fuel fracturing pumps can be fluidly connected to and combined with the fluid output of electric fracturing pumps. Together, the electric and non-electric fracturing pumps can be used to provide power for fracturing the well.

In the illustrated embodiment, two additional transformers 105-*i*, 105-*j* receive up to about 13.8 kV power or more from a switchgear trailer and provide a stepped-down voltage of down to about 600V or less to sand equipment 145, a hydration unit 160, blenders 165-*a*, 165-*b*, and/or a chemical additive unit 170. Power from transformers 105-*i*, 105-*j* can also be indirectly supplied to data van 155 via a VFD housing 130-*a*. 130-*b* of one or more blenders 165-*a*, 165-*b*, according to the illustrated embodiment.

In typical, hydraulically-powered systems, two or more auxiliary trailers (not shown) would be included in the hydraulic fracturing system 100 to house the hydraulic equipment and related power equipment such as VFDs, soft starters, motor control centers (MCCs), and breakers, for example. In the illustrated embodiment, the two transformers 105-*i*, 105-*j* are provided in lieu of the two auxiliary trailers, as bulky hydraulic motors may not be needed to power the ancillary equipment. The remaining equipment typically stored on the auxiliary trailers, such as the VFDs, soft starters, motor control centers, and breakers, can be relocated to the individual trailers housing each of the hydration unit 160, blenders 165-*a*, 165-*b*, and chemical additive unit 170. For example, according to an embodiment of the present disclosure, the entire hydraulic system typically positioned on and used to power each piece of ancillary equipment in known hydraulically-powered systems can be removed and replaced with a VFD housing.

Since the required equipment for the auxiliary trailer is partially or entirely eliminated by the substitution of electric power for hydraulic power, the embodiment illustrated in FIG. 1 can allow for elimination of the auxiliary trailer. With each of the VFDs, soft starters. MCCs. and breakers moved to respective blender 165-*a*, 165-*b* and hydration unit 160 trailers, the auxiliary trailer can be replaced with one or more transformers 105-*i*, 105-*j*.

Replacing the two typical auxiliary trailers with two 13.8 kV to 600V transformers 105-*i*, 105-*j* can conserve space at the hydraulic fracturing well site 100. The mixing equipment composed of two blenders 165-*a*, 165-*b*, a hydration unit 160, and a chemical additive unit 170 can each include a VFD housing 130-*a*, 130-*b*, 130-*c*, 130-*d*, respectively, in place of where the hydraulic power equipment would have been positioned on each respective trailer, as discussed in more detail below with respect to FIGS. 2, 3, 5, and 6.

In the illustrated embodiment, the two blender units 165-*a*, 165-*b* can be powered through separate transformers 105-*i*, 105-*j*. This configuration can provide redundancy such that if one switchgear, turbine, or transformer has a failure, the other blender will still be operational for flushing the wellbore and maintaining circulation.

According to an embodiment, blenders 165-*a*, 165-*b* can operate very similarly to a fracturing pump, with only a transformer 105-*i*, 105-*j* supplying power to the trailer on which each blender 165-*a*, 165-*b* is positioned, and with all supporting breakers and controls being locally positioned at blenders 165-*a*, 165-*b*. These transformers 105-*i*, 105-*j* can be small, skid-mounted enclosures that can be positioned close to the blenders 165-*a*, 165-*b* at the hydraulic fracturing system 100 well site, and can include connections for two or more pieces of equipment. Each connection can include six cables plus a ground cable, according to an embodiment, where the six cables are composed of two cables for each of the three power phases. In other embodiments, other numbers and combinations of cables, ground cables, and power phases can be used.

Typical electric motors may use 600V, three-phase electrical power, according to some embodiments. Alternate embodiments may use 4160V, 480V. or any other feasible three-phase voltage instead. Single-phase alternating current (AC) voltage can be used as well, with voltages including but not limited to 120V or 240V. In some embodiments, DC voltage, for example having simplified controls (e.g., lack of a VFD) can be used for smaller motors, at voltages including 5V. 12V. 24V, 48V, or any other reasonable DC voltage.

In the illustrated example, hydration unit 160 includes a trailer positioned to house mixing vessels and fluid pumps 135 and a VFD housing 130-*c*. The hydration unit 160 can hold up to 300 barrel units (bbl) of fluid in a mixing vessel 135, according to an embodiment, and between 200 bbl to 225 bbl of fluid according to another embodiment. The hydration unit 160 can supplement the capabilities of the blenders 165-*a*. 165-*b* by pulling on fluid through a suction manifold. Typically, fluid pulling is provided by a hydraulically powered fluid pump; however, in an embodiment according to the present disclosure, fluid pulling can be provided instead by an electrically powered fluid pump. The electric motor operating the fluid pump can be positioned on the trailer housing hydration unit 160, for example between the mixing vessels and pumps 135 and VFD housing 130-*c* in an embodiment, or under the VFD housing 130-*c* in another embodiment.

The mixing vessel 135 of hydration unit 160 can be used to premix chemicals for use in hydraulic fracturing operations and can act as a buffer in the event of a fluid delivery problem. For example, if a fracturing stage is being pumped at a fluid rate of 70 barrels per minute (bpm) when water transfer to the well site is lost, the mixing vessel 135 can provide operators with a three-minute window to determine the problem causing the lost water transfer and to resume water transfer, or to flush the surface equipment and shut down pumping operations.

The mixing vessel 135 can include an instrumentation and control package, which can allow the mixing vessel 135 to monitor, for example, any of fluid rate, pressure, viscosity, pH, temperature, and chemical additive rates in either automatic or manual modes of operation. All valves, paddles, and pumps associated with the mixing vessel 135 can be controlled and powered through an onboard circuit positioned on the trailer housing hydration unit 160.

A plurality of small electric motors can be used with various components associated with the hydration unit 160. For example, an electric motor can be used to rotate mixing paddles in a large mixing compartment of the hydration unit 160, while another electric motor can be used with a suction manifold to pull of the fluid, and still another electric motor can be used for driving the chemical pumps associated with the hydration unit 160. Each electric motor can be positioned at various discrete positions about the hydration unit 160 trailer in some embodiments, or can be clustered in other embodiments.

Chemical additive unit 170 can include a trailer positioned to house chemical pumps 140 and VFD housing 130-*d*. In some embodiments, a fracturing fleet can utilize four or five chemical pumps, depending on the particular needs of the fracturing site, or consumer requirements. In some embodiments, the blender units 165-*a* can include five to eight chemical pumps, although in other embodiments, one, two, three, four, nine, ten, or more chemical pumps can be included. In some embodiments, the hydration units 160 can additionally include five or more chemical pumps, although in other embodiments the hydration units 160 can include zero, one, two, three, or four chemical pumps, depending on particular fracturing site requirements or consumer preferences. In some embodiments, where both the blender units and the hydration units include chemical pumps, either the blender units 165-*a* or the hydration units 160 can provide all the chemicals needed for the fracturing slurry. In such embodiments, either the blender units 165-*a* or the hydration units 160 can serve as the primary chemical delivery method. Because of this redundancy, if either the blender unit or the hydration unit has a pump failure, the other, functioning unit can serve as a backup to provide the chemicals needed for the fracturing slurry. Thus, in some embodiments, the blender units 165-*a*, 165-*b* can also contain chemical pumps 125-*a*, 125-*b*, such that the hydration unit 160 can serve as either the backup chemical delivery system to the chemical delivery system of the blender units 165, or as the primary chemical delivery system. This backup chemical delivery system may be advantageous, for example, in use with certain chemicals. For example, guar gel (a viscosifier) needs time and fluid shear to properly mix and thicken, and accordingly should be added to the slurry mixture at the hydration unit 160. If added at one or more of the blenders 165-*a*, 165-*b*, guar gel may not have sufficient time to mix, and may result in an improper slurry viscosity, leading to less than ideal well production after the fracturing process is completed.

In some embodiments, chemical additive unit 170 can serve as the primary source of chemicals for the fracturing slurry. In other embodiments, chemical additive unit 170 can serve as the secondary or tertiary source of chemicals, after the hydration unit 160 and/or blenders 165-*a*. 165-*b*. The chemical additive unit 170 can include several chemical pumps and vats, and can be used to supplement the blenders 165-*a*, 165-*b*, particularly when the hydraulic fracturing operation requires multiple different chemicals or a particular chemical pump redundancy. In some embodiments, up to a dozen or more chemical pumps can be used with chemical additive unit 170. In some embodiments, the chemical pumps can be configured for use with liquid chemicals, while in other embodiments the chemical pumps can be dry chemical augers. In the latter case, a small hopper with a small, screw-type auger can pull the powder chemical from the hopper, and can drop the powder chemical into a mixing tub. Each blender can include one or more of these hopper and auger combinations, in some embodiments. In other embodiments, a larger dry chemical additive system can be incorporated into a hydration unit with a large mixing tub.

Like the hydration unit 160 and blenders 165-*a*, 165-*b*, the chemical additive unit 170 can be designed to be operated without the use of hydraulics, instead employing electric motors. The substitution of electrical power for hydraulic power can provide multiple advantages, as previously discussed, including saving space, enhancing reliability and versatility, improving ecological impact, being lighter, quieter, and safer, presenting fewer fire hazards.

The one or more chemical pump 140 of chemical additive unit 170 can include one or more electric motor, which can be stacked between the VFD housing 130-*d* and the chemical additive unit 170 in some embodiments, or can be installed underneath the VFD housing 130-*d* in other embodiments. The electric motors can be small enough to be positioned in various configurations around the chemical pump 140 trailer. The electric motors can operate components of the chemical pump 140 in lieu of the use of hydraulic power, the latter of which is typically provided from one or more auxiliary trailers.

Blenders 165-*a*, 165-*b* can include slurry mixing units 120-*a*, 120-*b*, pumps 125-*a*. 125-*b*, and VFD housings 130-*a*. 130-*d*. The slurry mixing units 120-*a*, 120-*b* and pumps 125-*a*, 125-*b* can each be electrically coupled to a respective electric motor to drive operation of the mixing units and pumps. In an embodiment, blenders 165-*a*. 165-*b* can further include a battery powered electric hopper raise/lower system to facilitate "spotting" the blender during rig-in. This raise/lower system can allow a proppant hopper to be lowered into place before turbine power is connected, so that operators can see where the hopper will rest in relation to a sand conveyor. With the introduction of electrically actuated valves according to the present disclosure, the raise/lower system can be tied into that battery system. This can allow the blender operator to open a manifold crossover in the event of an electrical failure (e.g., turbine shutdown, ground fault, cable disconnection, breaker opening, etc.). The manifold crossover can be a pipe that spans from the suction manifold to the discharge manifold, bypassing the mixing tub, discharge pump, and metering instrumentation. This configuration also provides an added operational backup, in which, if the primary blender loses power, the raise/lower system can still open the manifold crossover to allow the hydration unit 160 to boost water through the inoperable primary blender manifold to the secondary blender without shutting down the fracturing operation. This can prevent millions of dollars wasted during downtime by maintaining circulation in the well to prevent a "screen out," in which additional nonproductive services such as coil tubing, flow back, or a workover rig will be required to clean out the well.

Figures 2, 3:
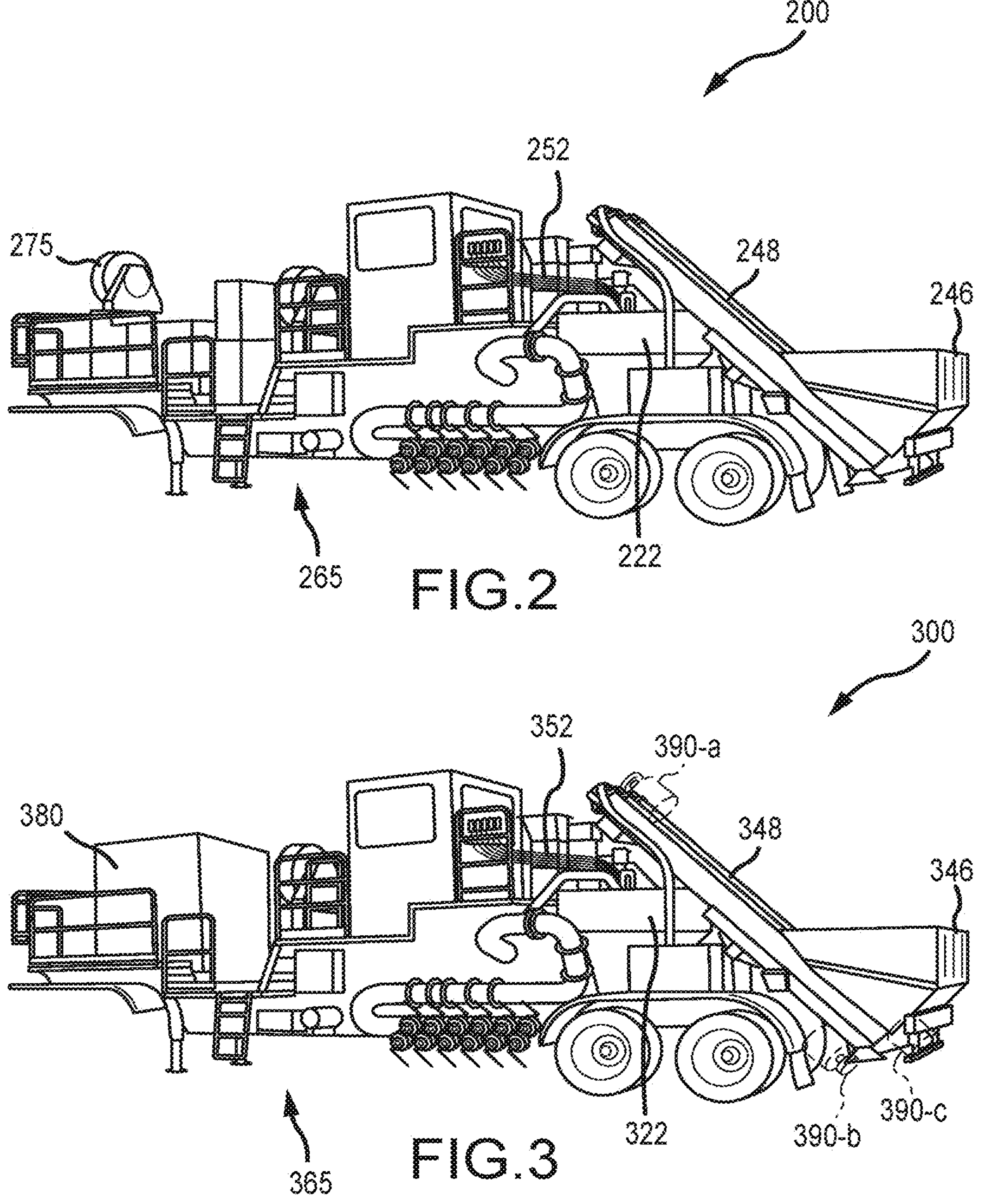
FIG. 2 is a schematic perspective view of a blender trailer, powered by a hydraulic pump, for use in a hydraulic fracturing system, according to an embodiment.
FIG. 3 is a schematic perspective view of a blender trailer, powered by an electric motor, for use in a hydraulic fracturing system, according to an embodiment.

FIG. 2 shows a perspective schematic view of an example 200 of a hydraulically powered hydraulic fracturing blender 265, as is typically used in hydraulic fracturing systems. The hydraulic fracturing blender 265 can be used to mix multiple dry and liquid chemicals and different types of proppant (usually sand). The blender 265 can pull fluid in through a suction manifold with a hydraulically powered suction pump and discharge the mixed or unmodified fluid at over 100 pounds per square inch (psi) and 130 barrels per minute (bpm) through a discharge manifold with a large electrically-driven discharge pump. Proppant can be deposited in proppant hopper 246, and can move up rotating auger 248, before being dumped into mixing tub 222. Hoses 252 can supply chemicals and fluids to be mixed with the proppant in mixing tub 222, and the mixed product can be pumped to the fracturing pumps through the discharge manifold.

A typical blender 265 as illustrated can also include a monitoring and controls instrumentation package, which allows the blender 265 to monitor and control fluid density, fluid rate, fluid pressure, chemical additive rates, and proppant additive rates, in either manual or automatic modes. In the shown embodiment, all pumps (except for the discharge pump and air blowers), valves, and augers can be controlled and powered through a hydraulic circuit 275, positioned at a front end of the trailer on which blender 265 is positioned.

FIG. 3 shows a perspective schematic view of an example 300 of an electrically powered hydraulic fracturing blender 365, according to an embodiment. Blender 365 shows an alternative embodiment to blender 265 as illustrated in FIG. 2, providing an example configuration in which the hydraulic circuit 275 powering blender 265 is replaced with one or more electric motor 390 and a VFD 380 to provide electrical, rather than hydraulic, operation to blender 365. In some embodiments, an electric motor 390 can be provided for each suction pump, chemical pump, and/or tub paddle associated with the blender 365. As illustrated in FIG. 3, in examples where the electric motor 390 operates a sand auger associated with blender 365, the electric motor 390-*a*, 390-*b*, 390-*c* can be positioned in any of three distinct positions with respect to blender 365, as discussed in more detail below with respect to FIG. 4, or in any other appropriate positions on the blender trailer.

Each of the elements of blender 265, including mixing tub 222, proppant auger 248, proppant hopper 246, and hoses 252 can operate identically in blender 365. For example, proppant can be deposited in proppant hopper 346, and can move up rotating auger 348, before being dumped into mixing tub 322. Hoses 352 can supply chemicals and fluids to be mixed with the proppant in mixing tub 322, and the mixed product can be boosted to the fracturing pumps from the discharge manifold. However, unlike the elements of blender 265, which are hydraulically powered, each element of blender 365 can be operated by an electric motor 390, in the absence of hydraulic circuit 275. With hydraulic circuit 275 removed, the trailer housing blender 365 can have sufficient space at the front of the trailer to support a VFD 380 to control and deliver power to the electric motor 390-*a*, 390-*b*, 390-*c* to mechanically rotate the proppant augers, as discussed in more detail with respect to FIG. 4 below.

Figure 4:
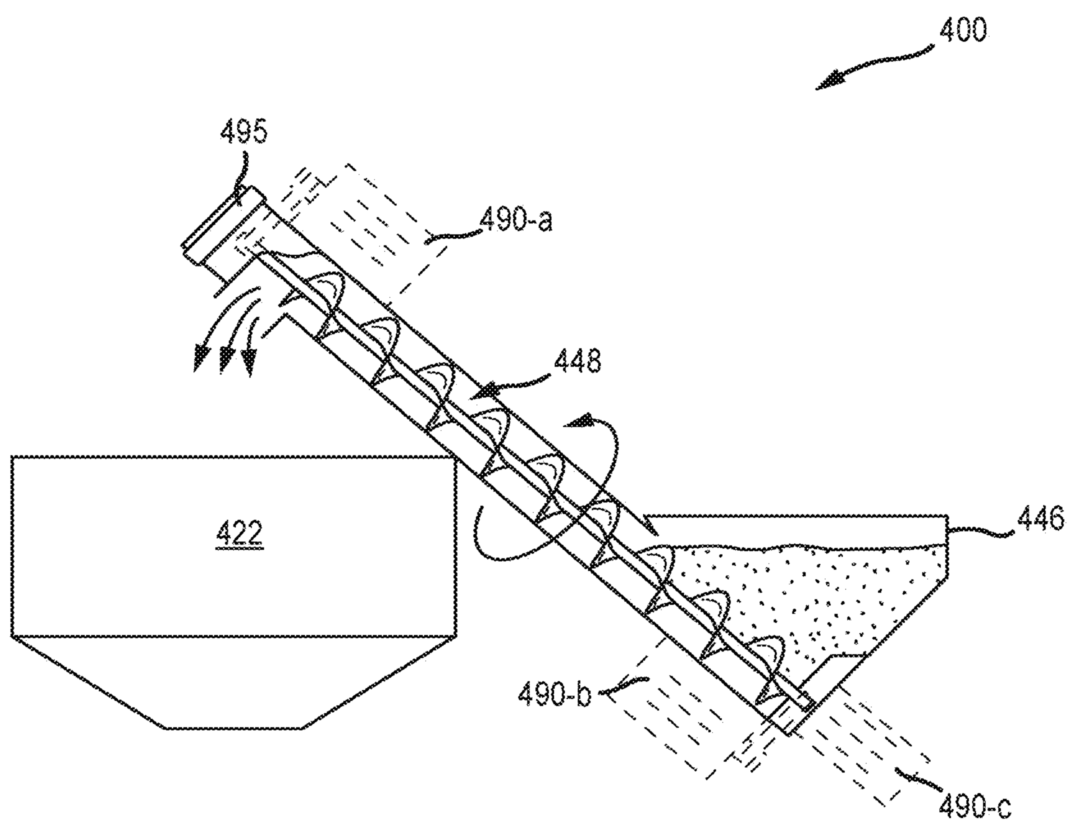
FIG. 4 is a schematic perspective view of auger, proppant hopper, and mixing tub components of the blender trailer of FIG. 3, according to an embodiment.

FIG. 4 shows a side schematic view of an example 400 of the proppant auger portion 448 of the electrically powered hydraulic fracturing blender 365 as illustrated in FIG. 3, according to an embodiment. As discussed above with respect to FIG. 3, proppant can be deposited into proppant hopper 446, and can be moved up rotating proppant auger 448 to be dumped into mixing tub 422. In some embodiments, the proppant auger 448 of blender unit 365 can include three large proppant augers on the rear of the trailer, which lead from the hopper 446 to the mixing tub 422. In other embodiments, 1, 2, 4, or more proppant augers can be utilized. Chemicals and fluids can be added to mixing tub 422 to be mixed with the proppant, and the mixed proppant can be discharged through a discharge manifold to the fracturing pumps.

As discussed above with respect to FIGS. 2 and 3, the proppant auger 448 is typically hydraulically driven, often by a hydraulic motor 495 positioned on the top of the proppant auger tube 448. As the trailer housing the fracturing blender 365 is mobile, roadway height restrictions must be taken into account in positioning the components of the blender 365 on the trailer. In typical, hydraulically-powered blenders (as illustrated in FIG. 2), the hydraulic motor 495 may be positioned at a top end of proppant auger 448. Hydraulic motors are typically divided into two parts—the hydraulic pump and the hydraulic motor—with pressurized hoses connecting each part. Because of this configuration, each part of the hydraulic motor individually takes up less space than does a typical electric motor. A typical electric motor is constructed as a single unit, such that replacing a component of the hydraulic motor with the electric motor in the same position as the component of the hydraulic motor may result in the trailer housing the blender 365 exceeding roadway height restrictions.

Thus, in the electrically-powered blender 365 illustrated in example 400, the hydraulic motor 495 may be removed, and an electric motor may be positioned on the sloped surface of the proppant auger 448, such that the larger electric motor does not extend higher than the smaller hydraulic motor 495 would have extended. For example, in an embodiment, the electric motor 490-*a* may be positioned near an upper end of the top face of the proppant auger 448, parallel to the proppant auger tube. In this configuration, a chain, gear, or belt coupling, or another appropriate coupling, may be used to drive the auger. In another embodiment, the electric motor 490-*b* may be positioned near a lower end of the bottom face of the proppant auger 448, and the electric motor may be configured to spin the auger from the bottom. In still another embodiment, the electric motor 490-*c* may be positioned at a bottom end of the proppant auger 448. Various other configurations are also contemplated, any of which enable the arrangement of the elements of blender 365 on the trailer to comply with roadway restrictions.

Electric motor 490-*a*, 490-*b*, 490-*c* can be a 600 V, three-phase motor in an embodiment, or can be a single-phase motor having a different voltage in other embodiments. In some examples, the electric motor may be small, for example the size of a small trashcan, while in other examples the electric motor may be larger. In examples where the electric motor is small, the electric motor may be configured to dissipate heat independently, such that a cooling apparatus is not needed. In some examples the electric motor can use AC power, while in other examples the electric motor can use DC power. The electric motor may work in conjunction with a transformer in some examples. In some embodiments, the electric motor can generate at least about 30-40 horsepower (HP) in order to provide sufficient power to rotate proppant auger 448. In other embodiments, other electric motor power levels are contemplated; for example, an electric motor for use with a chemical pump may operate around 15 HP, an electric motor for use with augers may operate around 50 HP, and an electric motor for use with a suction pump may operate around 200 HP. The electric motor can be an induction motor or a permanent magnet motor, according to various embodiments.

Figures 5, 6:
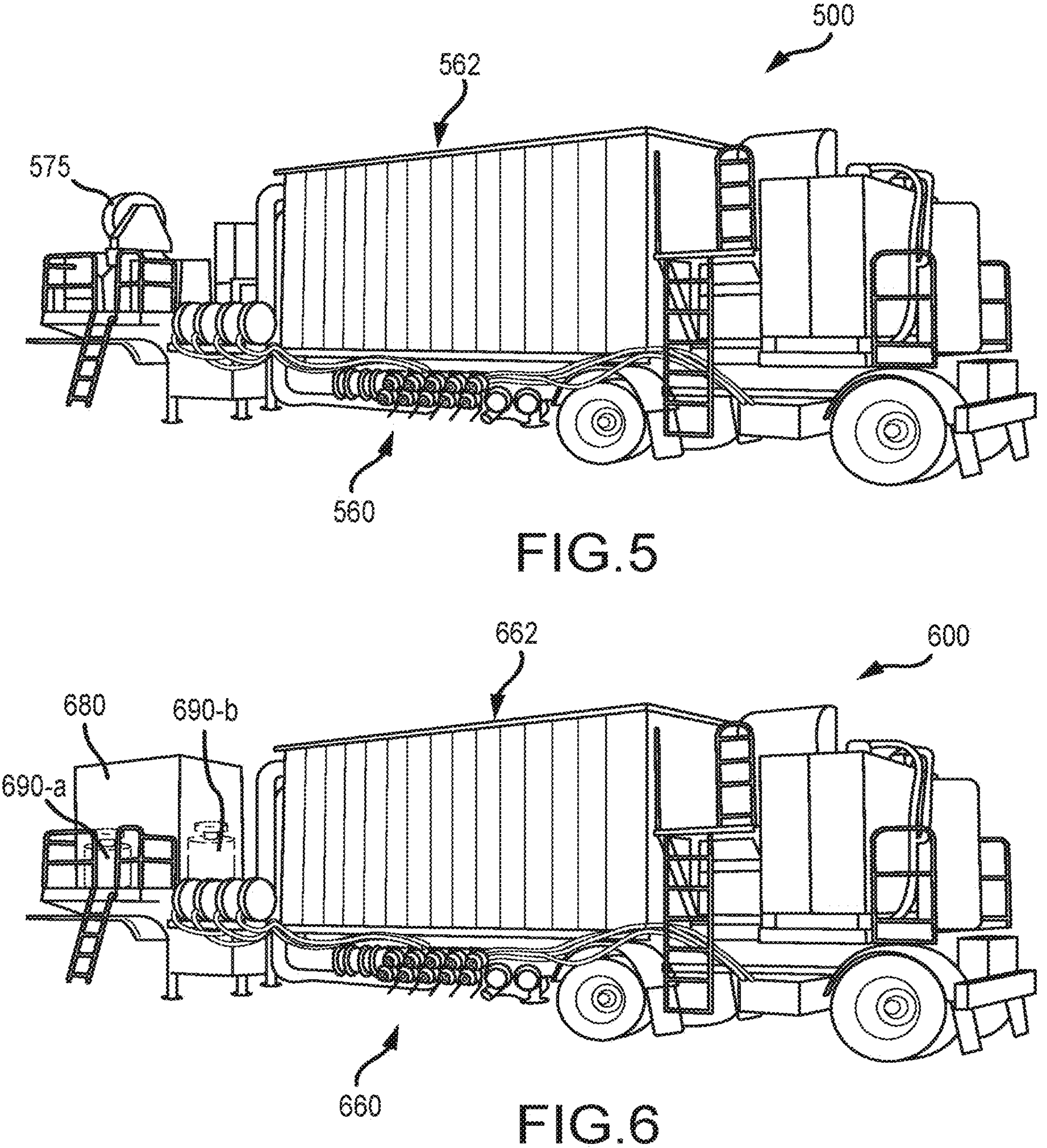
FIG. 5 is a schematic perspective view of a hydration unit trailer, powered by a hydraulic pump, for use in a hydraulic fracturing system, according to an embodiment.
FIG. 6 is a schematic perspective view of a hydration unit trailer, powered by an electric motor, for use in a hydraulic fracturing system, according to an embodiment.

FIG. 5 shows a perspective schematic view of an example 500 of a typical hydraulically-powered hydration unit 560. The hydration unit 560 can supplement the capabilities of the blender 365, as discussed above with reference to FIGS. 3 and 4. In the illustrated example 500, hydration unit 560 can be powered by a hydraulic circuit 575, an electric motor (HPU) for which is illustrated in FIG. 5 as positioned at a front end of the hydration unit 560 trailer.

The hydration unit 560 is configured to pull on fluid through a suction manifold with a hydraulically powered fluid pump, and can hold up to about 300 bbl of fluid in a mixing vessel 562. The mixing vessel 562 can be used to premix chemicals before use in the hydraulic fracturing process, and can act as a buffer in the event of a fluid delivery problem. For example, if a fracturing stage is being pumped at a fluid rate of 70 bpm when water transfer to the wellsite is lost, the hydration unit 560 can provide the operators with a three-minute window in which to determine the problem and resume water transfer, or to flush the surface equipment and shut down pumping operations.

Onboard hydration unit 560 can be an instrumentation and control package that allows the hydration unit 560 to monitor fluid rate, pressure, viscosity, pH, temperature, and chemical additive rates in either automatic or manual modes of operation. All valves, paddles, and pumps can be controlled and powered through an onboard hydraulic circuit.

FIG. 6 shows a perspective schematic view of an example 600 of an electrically powered hydraulic fracturing hydration unit 660, according to an embodiment. Hydration unit 660 shows an alternative embodiment to hydration unit 560 as illustrated in FIG. 5, providing an example configuration in which the hydraulic circuit 575 powering hydration unit 560 is replaced with one or more electric motor 690 and a VFD house 680 to provide electrical, rather than hydraulic, operation of hydration unit 660. In some embodiments, an electric motor 690 can be provided for each of the one or more chemical pumps, suction pumps, and mixing paddles associated with hydration unit 660.

The remaining components of hydration unit 660, such as mixing vessel 662, may operate as described above with respect to FIG. 5. However, components of hydration unit 660, such as suction pumps and mixing paddles, may be driven by one or more electric motors 690 via VFD housing 680, rather than by a hydraulic circuit 575. In some embodiments, the electric motor 690-*b* may be positioned between mixing vessel 662 and VFD housing 680. In other embodiments, the electric motor 690-*a* may be positioned in front of, behind, or under VFD housing 680. Alternate electric motor 690-*a*, 690-*b* positions on the hydration unit 660 trailer are also contemplated. As discussed above with respect to the hydraulic fracturing blender of FIGS. 3 and 4, in some embodiments it may be advantageous to consider roadway height regulations in determining where to position the electric motor 690-*a*, 690-*b*. For example, positioning the electric motor 690-*a*, 690-*b* atop mixing vessel 662 may result in the overall height of the hydration unit 660 trailer exceeding roadway height limitations in some cases, but may be permissible in other instances, depending upon specific regulations.

In some embodiments, the removed hydraulic circuit 575 may be replaced by VFD housing 680 on the front portion (or "tongue") of the trailer. In other embodiments, rather than placing the VFD housing 680 on the tongue of the trailer, the front of the trailer may be left as an open deck with or without perimeter rails, such that the open space can be used for chemical tote or other component storage. For example, hydraulic fracturing sites often include at least one flatbed or drop deck trailer provided for storing chemical totes thereon; however, use of separate trailers for chemical totes may necessitate the use of several independent chemical lines spanning between the totes and the hydration unit 660 trailer. By instead storing the chemical totes on the hydration unit 660 trailer, both the separate storage trailers and the chemical lines may be eliminated, thereby conserving space at the hydraulic fracturing site and limiting the use of materials, such as chemical lines, which may be expensive, faulty, dangerous, and cumbersome.

In another embodiment, a small acid vessel can be positioned on the vacant trailer deck position. This embodiment may be useful for trigger toes (e.g., where no sand is pumped, the well is pressurized to open a sleeve called the "toe," and small quantities of water and acid are displaced to open the formation and surrounding cement) or for low-rate fracturing jobs (e.g., conventional or non-shale jobs, typically performed at less than 50 bpm or even as low as 5 bpm, as opposed to 70-120 bpm for shale jobs). In one example, the acid vessel could hold about 500 to 1500 gallons of acid, for example hydrochloric acid (HCL) at a concentration of about 15% to 30%, and could be completely enclosed and refillable from a supply acid tanker. Other acids and different concentrations are also feasible. In this configuration, extra landing gear to support the weight of the trailer while rigged-in may be required.

In examples where the equipment is dedicated to low-rate jobs, pump downs only, or trigger toes, and is specifically designed for a maximum of about 60 bpm (as opposed to about 130 bpm for typical electric blenders), for example, a small open-top mixing tank may be positioned on the open deck space to combine the qualities of the hydration unit and blender onto a single unit. According to such an embodiment, the single unit may include a large electric discharge motor (e.g., about 1000 HP or more) for boosting fluid to fracturing pumps capable of about 120 psi charge pressure, in one example. The single unit could also include multiple chemical pumps (e.g., 5-10 liquid pumps, 2-4 dry chemical hoppers), and optional sand augers if the unit will be used for low-rate well stimulation. In some embodiments, the single unit could further include an optional chemical premixing tank with an open top and mixing paddles (having, for example, 50-100 bbl capacity) plumbed into the suction lines of the unit. This configuration could take the place of the HPU motor and hydraulics in typical electric blender models.

Additional elements of the single unit could include an optional acid tank plumbed into the discharge lines; optional open deck space for chemical totes, pallets, or vats; or an optional VFD housing with all required breakers, soft starters, and VFDs for reduced interconnecting cables. The single unit could also include a supplemental mixing tub (e.g., having about 5-10 bbl volume) if sand augers are installed; a suction pump for drawing water from a source; and/or a full instrumentation package (e.g., Densometer, suction and discharge flow meters, suction and discharge pressure transducers, pH probe, fluid temperature probe, viscometer, chemical flow meters, and others)

In the described example single unit, the purpose of the large open top mixing tank can be to allow for the premixing of gel. Gel is usually made of guar, but can be composed of synthetic origins as well, and can be added to the vat in condensed liquid form or in a powder form. Premixing may be required where the viscosifier can take several minutes to hydrate, and may need extra time to mix the gel with water. Facilitating this premixing is the typical role of the hydration unit, in addition to containing supplemental chemical pumps and acting as a fluid buffer in the event of an issue with the water supply. If a mixing tank is installed, extra landing gear may be required to support the weight of the extra fluid once the unit is rigged in and filled.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A chemical additive system configured to provide chemical additives for hydraulic fracture treatments, the chemical additive system comprising:
- a chemical additive trailer;
- chemical pumps installed on the chemical additive trailer, the chemical pumps being configured to pump chemical additives from one or more chemical sources to a blender disposed on a blender trailer for addition to a fracturing slurry produced by the blender trailer, the blender comprising a mixing tub that receives the chemical additives from the chemical pumps and a proppant auger that transports a proppant into the mixing tub;
- electric motors installed on the chemical additive trailer and configured to drive the chemical pumps; and
- a variable frequency drive (VFD) housing installed on the chemical additive trailer, the VFD housing comprising variable frequency drives configured to control the electric motors.

2. The chemical additive system of claim 1, wherein at least one of the chemical pumps is a redundant chemical pump configured to operate in the event that another chemical pump fails.

3. The chemical additive system of claim 1, comprising a dozen chemical pumps installed on the chemical additive trailer.

4. The chemical additive system of claim 1, wherein each of the electric motors is configured to drive a respective one of the chemical pumps.

5. The chemical additive system of claim 1, wherein the chemical additive system is configured to operate as a secondary source of chemical additives for the blender trailer.

6. The chemical additive system of claim 1, wherein the chemical additive system is configured to operate as a tertiary source of chemical additives for the blender trailer and a hydration trailer.

7. The chemical additive system of claim 1, wherein at least one of the chemical pumps is configured to pump a viscosifier additive to the blender trailer.

8. The chemical additive system of claim 1, further comprising the blender trailer, wherein the blender trailer comprises additional chemical pumps configured to provide other chemical additives for addition to the fracturing slurry.

9. The chemical additive system of claim 1, further comprising:
- a discharge manifold fluidly coupled to the mixing tub and at least one fracturing pump;
- a suction manifold that is fluidly coupled to the mixing tub.

10. A method for providing chemical additives for hydraulic fracture treatments, the method comprising:
- operating chemical pumps installed on a chemical additive trailer to pump chemical additives from one or more chemical sources to a blender disposed on a blender trailer for addition to a fracturing slurry produced by the blender trailer, the blender comprising a mixing tub that receives the chemical additives from the chemical pumps and a proppant auger that transports a proppant into the mixing tub;
- operating electric motors installed on the chemical additive trailer to drive the chemical pumps; and
- operating variable frequency drives installed on the chemical additive trailer to control the electric motors.

11. The method of claim 10, wherein operating the chemical pumps comprises operating at least one of the chemical pumps as a redundant chemical pump configured to operate in the event that another chemical pump fails.

12. The method of claim 10, wherein operating the chemical pumps comprises operating a dozen chemical pumps.

13. The method of claim 10, wherein operating the electric motors comprises operating each of the electric motors to drive a respective one of the chemical pumps.

14. The method of claim 10, wherein operating the chemical pumps comprises operating the chemical pumps as a secondary source of chemical additives for the blender trailer.

15. The method of claim 10, wherein operating the chemical pumps comprises operating the chemical pumps as a tertiary source of chemical additives for the blender trailer and a hydration trailer.

16. The method of claim 10, wherein operating the chemical pumps comprises operating at least one of the chemical pumps to pump a viscosifier additive to the blender trailer.

17. The method of claim 10, comprising operating additional chemical pumps installed on the blender trailer to provide other chemical additives for addition to the fracturing slurry.

18. The method of claim 10, further comprising:

introducing the chemical additives to the mixing tub through a suction manifold;

discharging the fracturing slurry from the mixing tub through a discharge manifold.

* * * * *